Jan. 25, 1938. A. B. BELL 2,106,163
PRINTER'S TYPE CABINET
Filed June 17, 1936 9 Sheets-Sheet 1
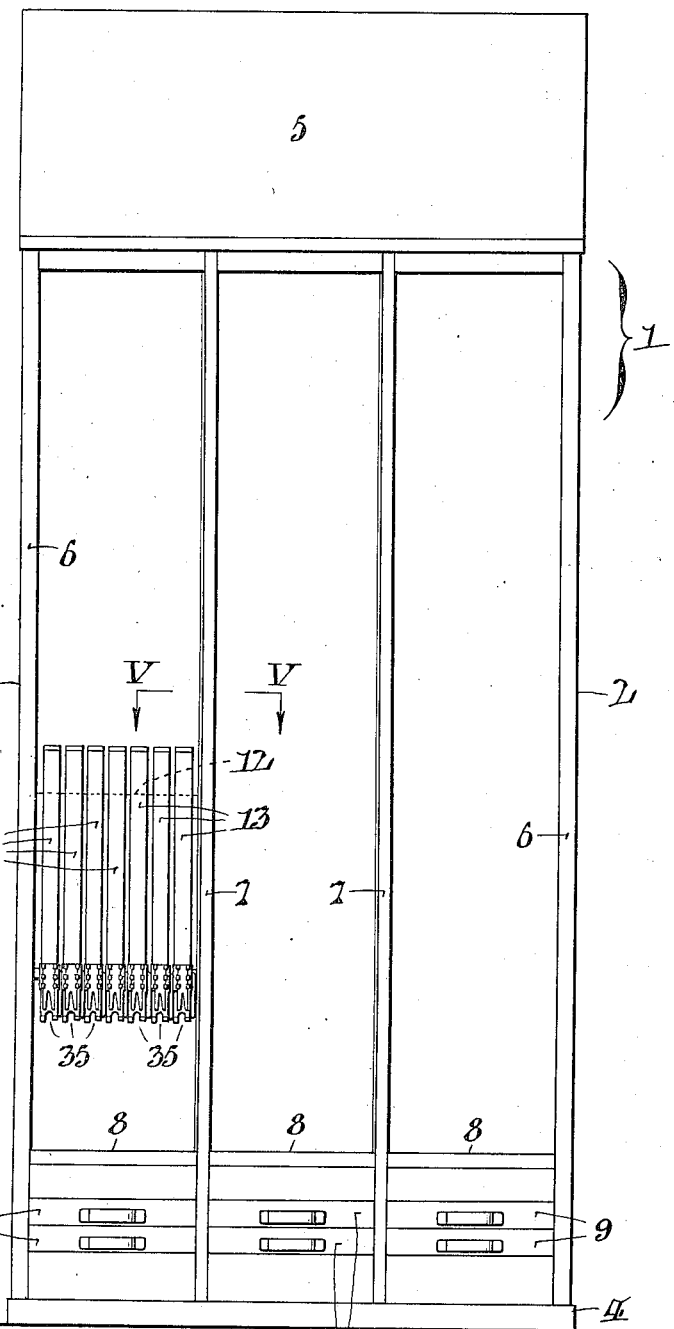

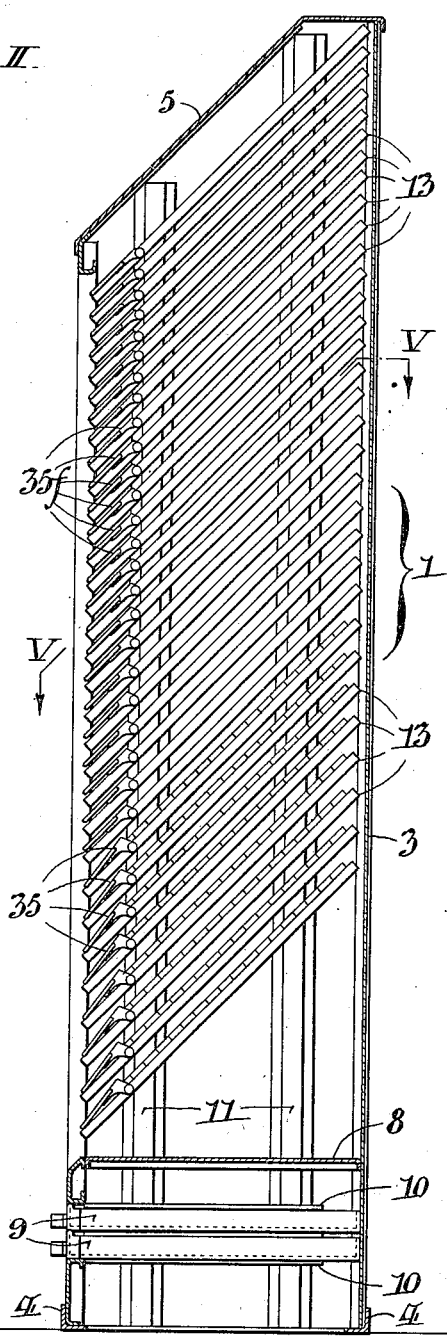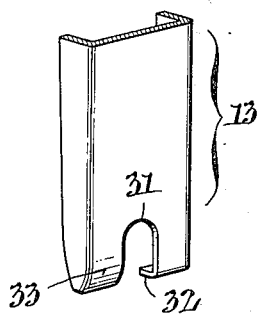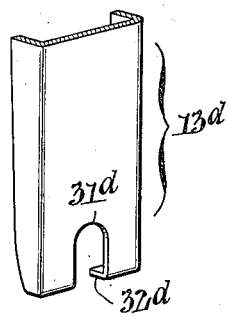

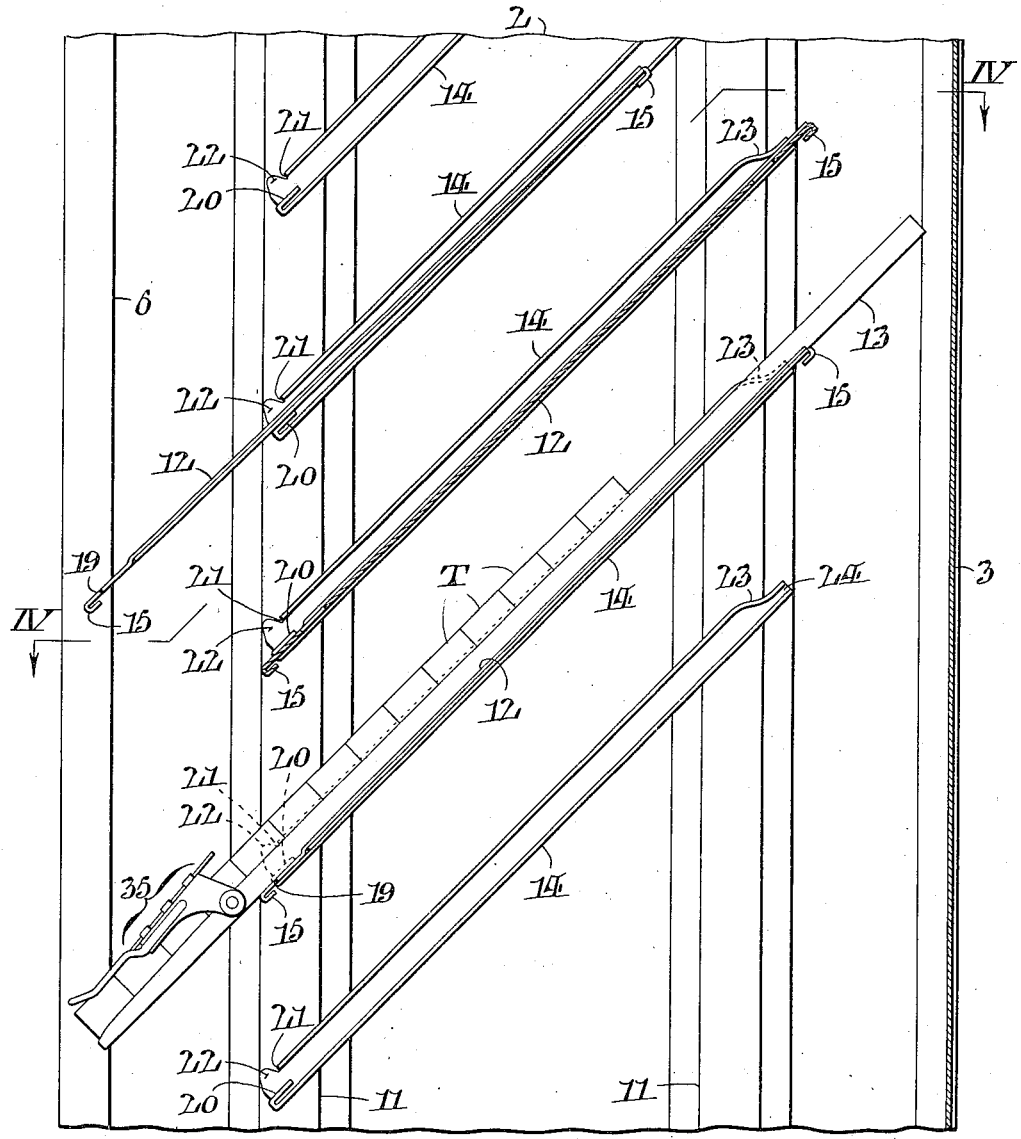
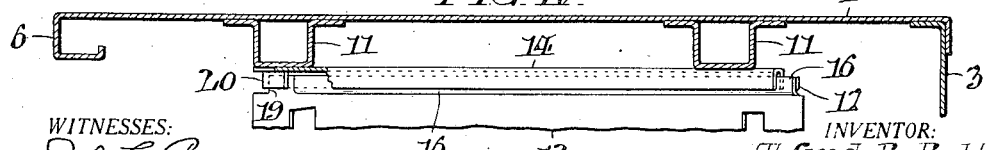

Jan. 25, 1938. A. B. BELL 2,106,163
PRINTER'S TYPE CABINET
Filed June 17, 1936 9 Sheets-Sheet 4
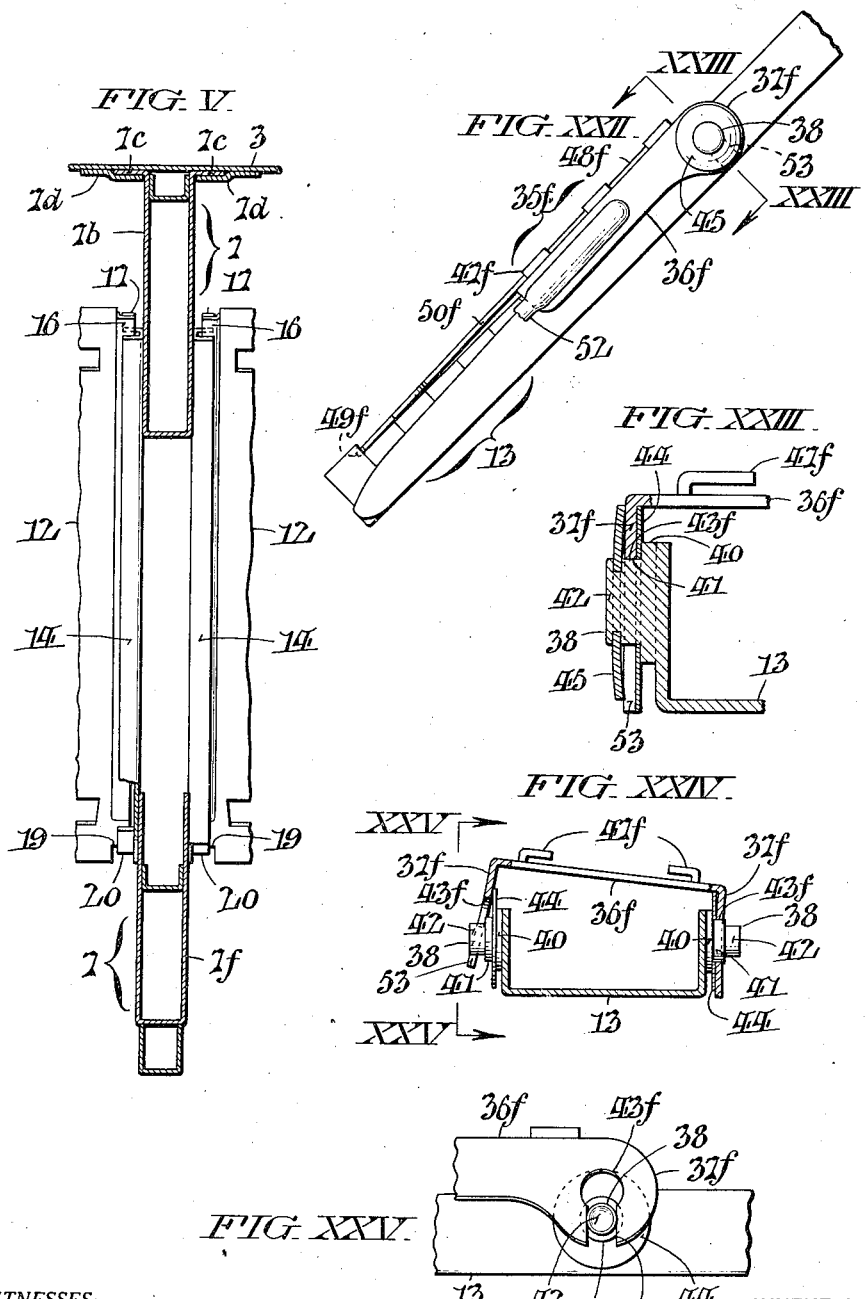

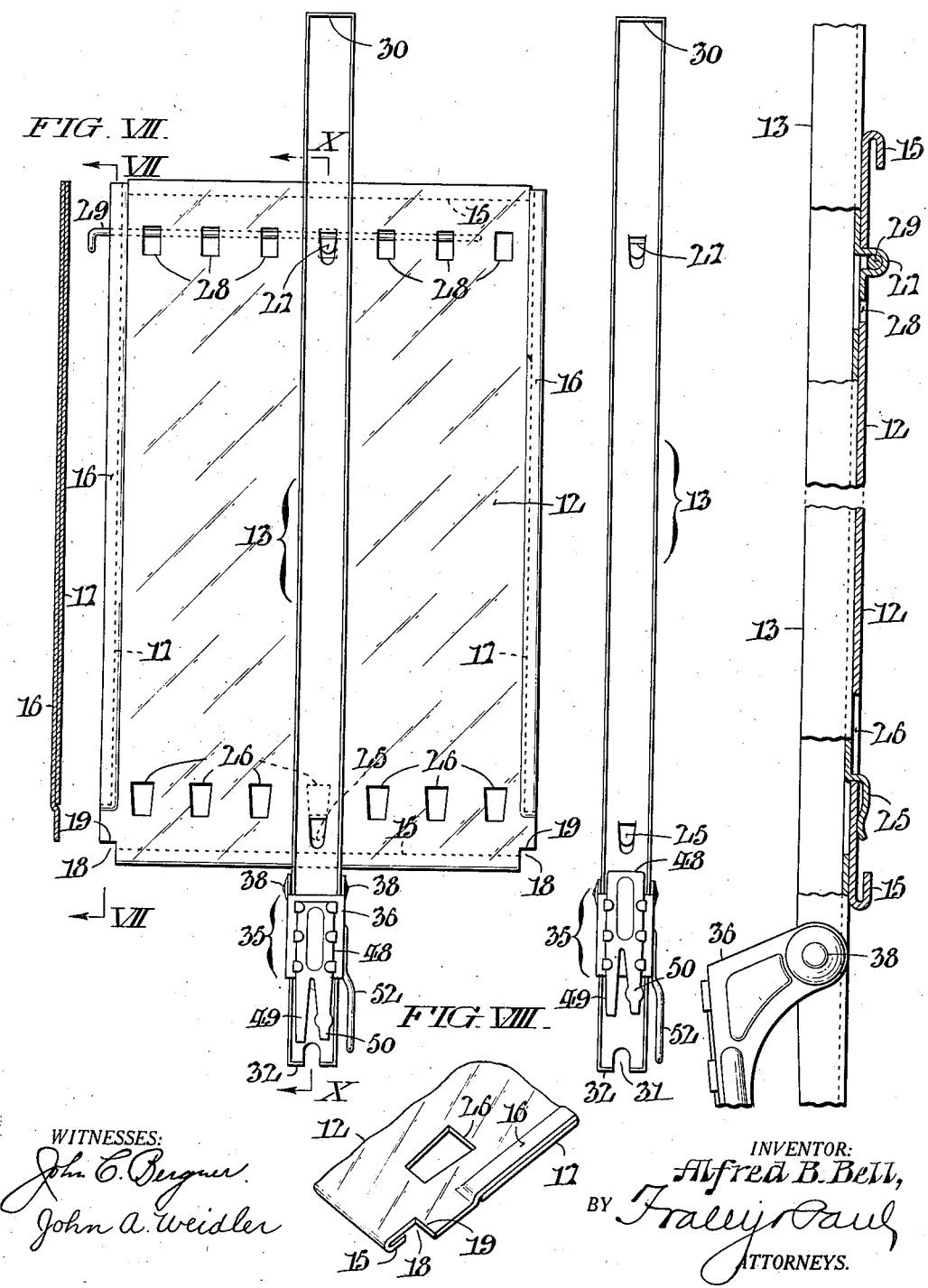

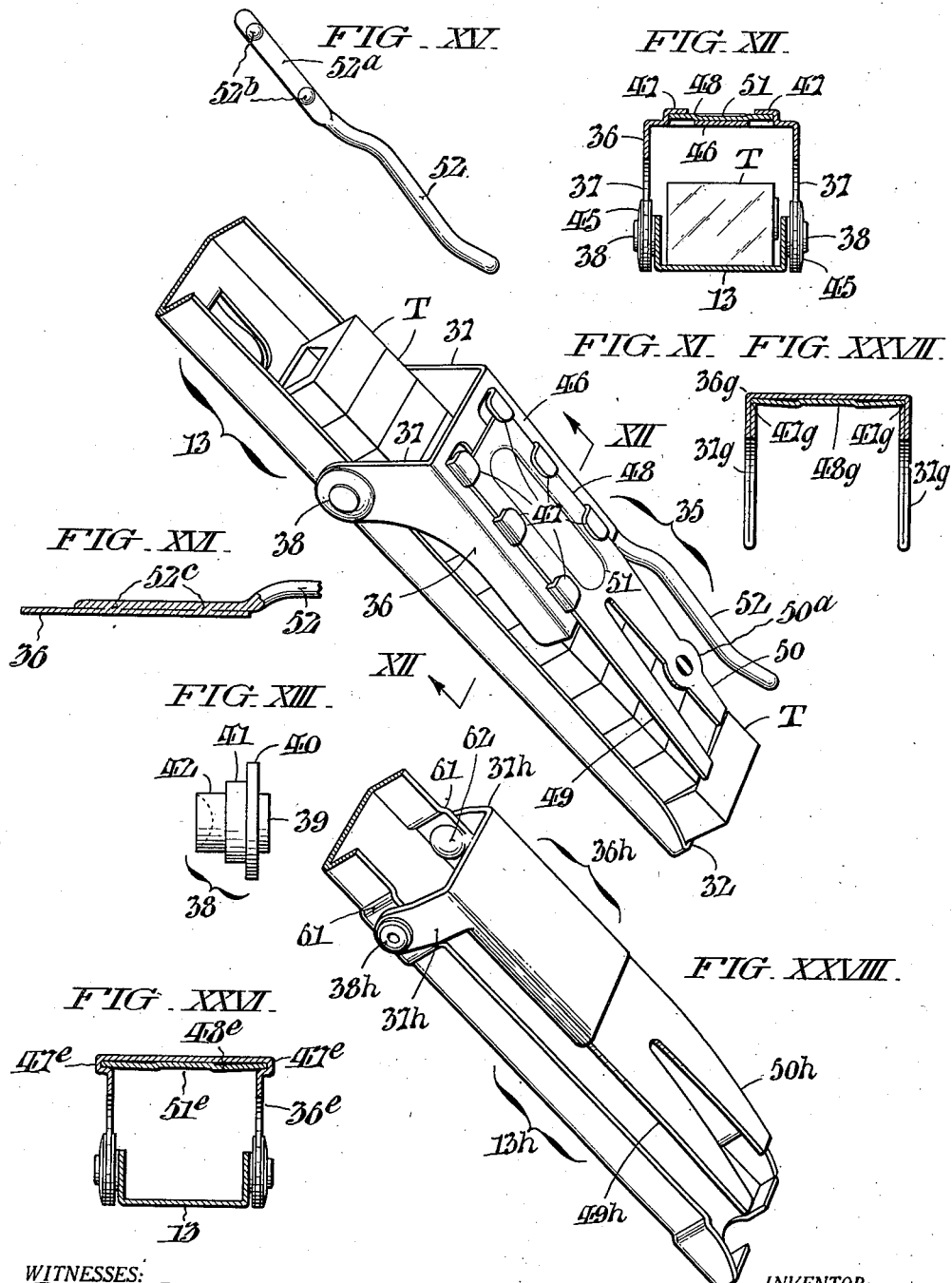

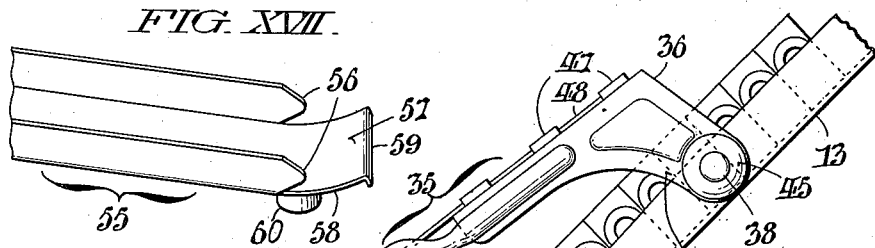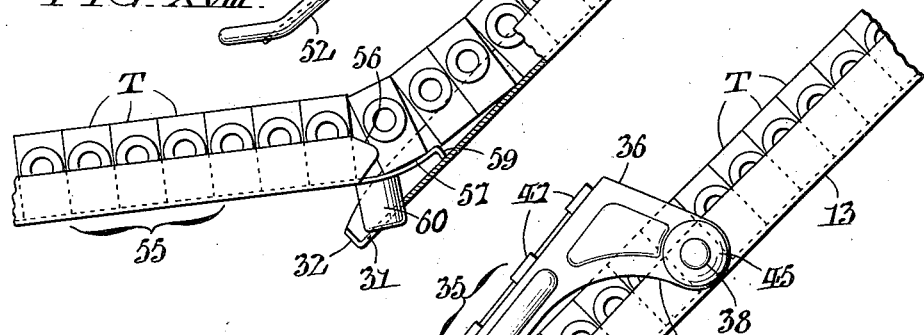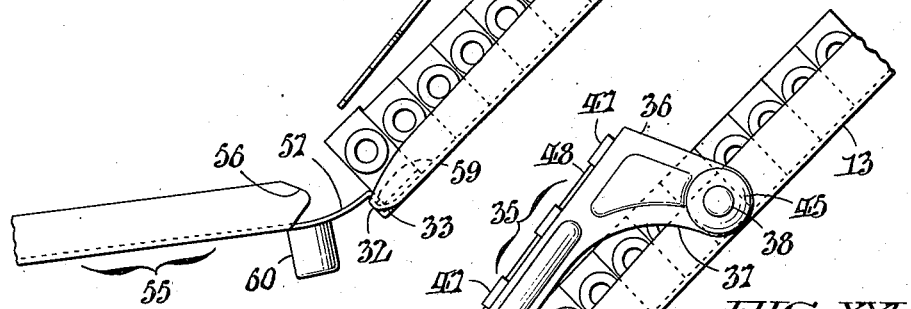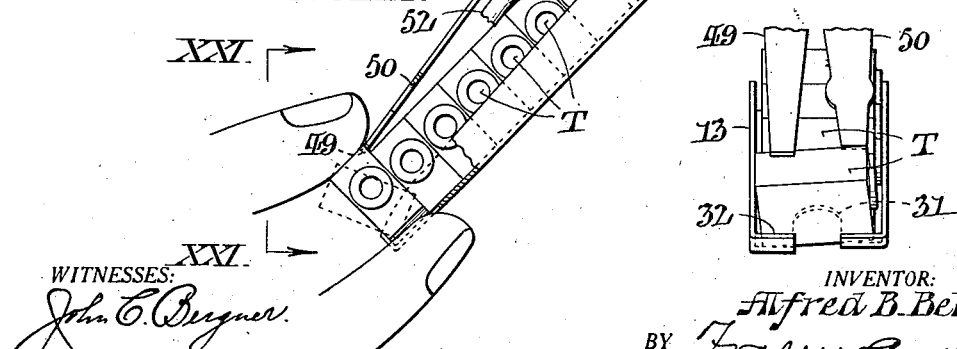

Jan. 25, 1938. A. B. BELL 2,106,163
PRINTER'S TYPE CABINET
Filed June 17, 1936 9 Sheets-Sheet 8
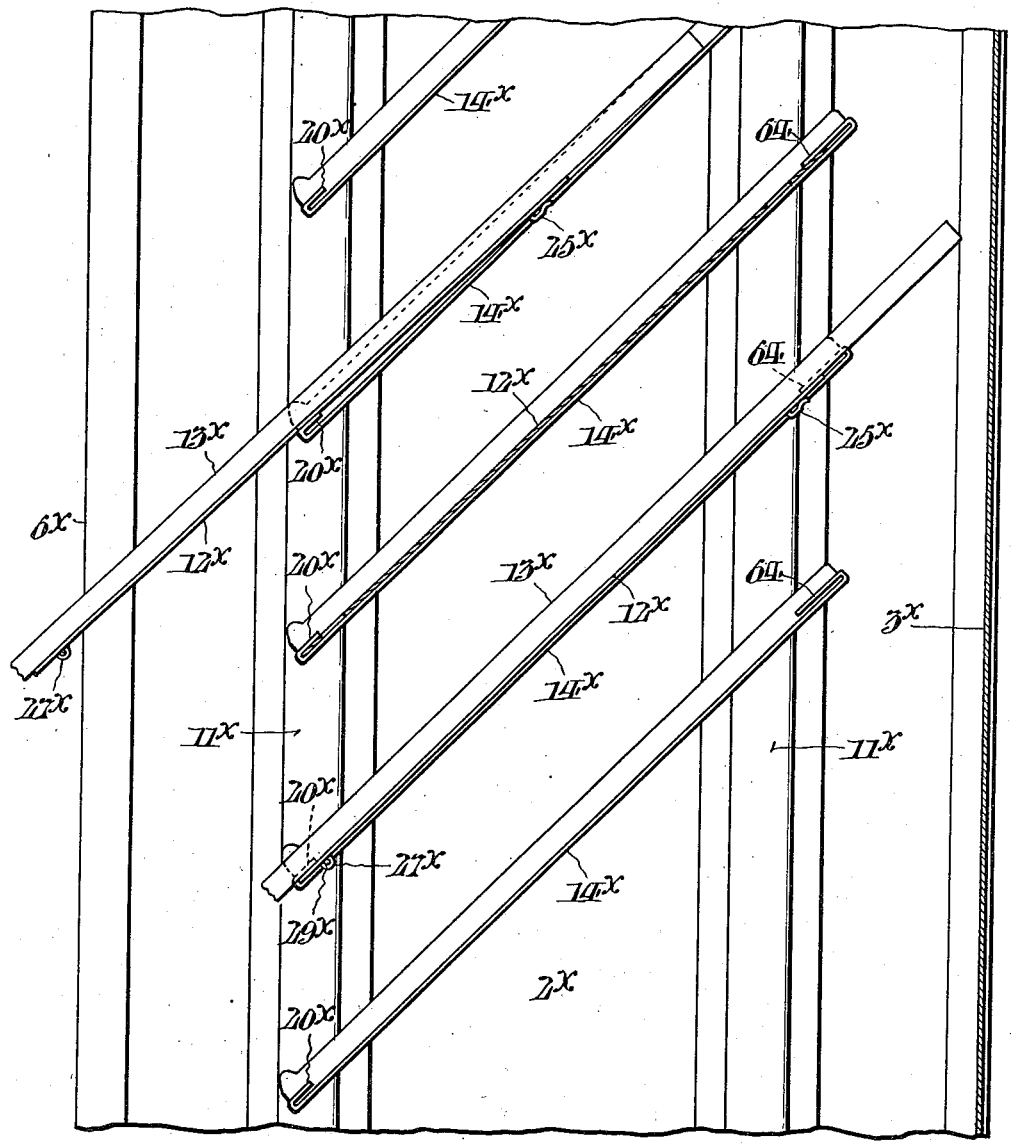
FIG. XXX
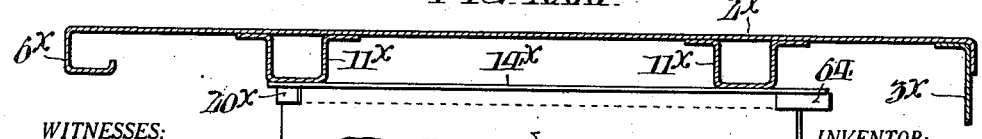
FIG. XXXI Jan. 25, 1938. A. B. BELL 2,106,163
PRINTER'S TYPE CABINET
Filed June 17, 1936 9 Sheets-Sheet 9
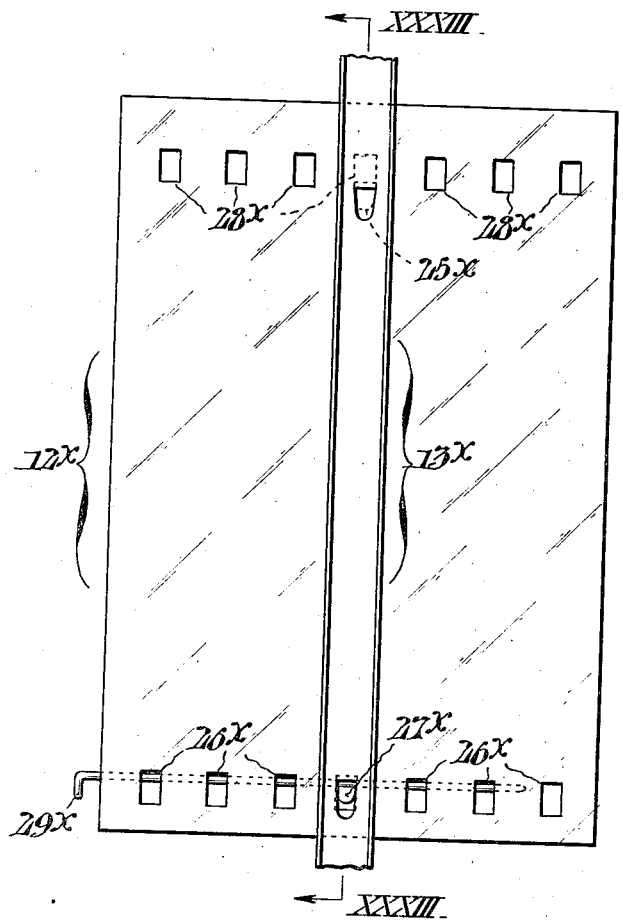
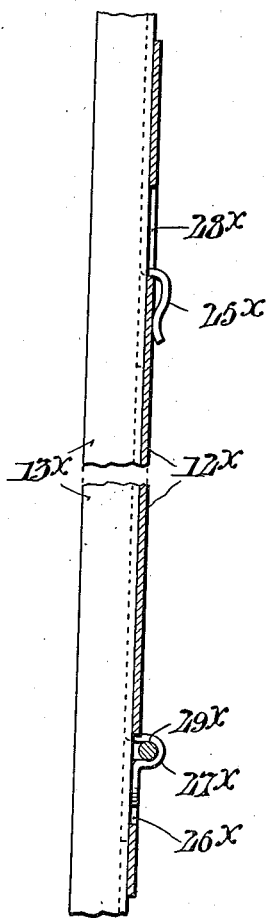
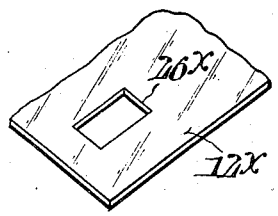
WITNESSES:
John C. Bergner
John A. Weidler
INVENTOR:
Alfred B. Bell,
BY Fraley & Paul
ATTORNEYS.

Patented Jan. 25, 1938

2,106,163

UNITED STATES PATENT OFFICE 2,106,163

PRINTER'S TYPE CABINET

Alfred B. Bell, Philadelphia, Pa.

Application June 17, 1936, Serial No. 85,671

34 Claims. (Cl. 276—45)

This invention relates to cabinets useful to printers; and it has reference more particularly to cabinets of the kind wherein the different type are contained in separate inclined gravity feed chutes from which the type blocks are adapted to be removed by the printer as needed in composing.

An object of my invention is to provide a type cabinet of the kind referred to, which is compact and therefore requires but a small space for its accommodation; and which lends itself to economic construction from sheet metal.

In connection with a printer's type cabinet having the above attributes, it is a further aim of my invention to provide improved facilities which will enable the ready insertion, removal and universal interchange of shelves each supporting a number of the gravity type chutes in close contiguity.

Another object of my invention is to provide improved facilities for securing the chutes to the shelves with capacity for individual removal after either complete or partial withdrawal of the shelves from the cabinet.

My invention is also directed toward the provision, in association with each gravity feed chute, of a simple and reliable spring keeper means which will yield to enable the endmost type block in the chute to be removed while holding the next adjacent type block against the possibility of being withdrawn at the same time, and which, moreover, is adjustable for adaptation of the chute to type blocks of different sizes as well as movable out of the way to facilitate loading of the chute.

Still another object of my invention is to provide transfer means capable of respectively receiving different type directly from a type casting machine, and adapted to be individually connected to the chutes so that said chutes may, without necessitating their removal from the cabinet, be quickly refilled, upon exhaustion, with a new supply of type.

Amongst the advantages secured through my invention are the elimination of the delays ordinarily attendant upon type replenishment under existent systems; the elimination of type casting into storage boxes; the elimination of type storage and the necessity for filling and sorting of type cases from the storage; the reduction in the inventory of type metal ordinarily required for storage and resultant saving in metal investment; the attainment of greater speed in type setting; and the making of straight line production possible.

Further objects and attendant advantages will be manifest from the detailed description following of the attached drawings, wherein Fig. I is a front elevation of my novel type storing and dispensing cabinet.

Fig. II is a vertical sectional view of the cabinet.

Fig. III is a fragmentary vertical sectional view corresponding to Fig. II and drawn to a larger scale.

Fig. IV is a fragmentary detail sectional view taken as indicated by the arrows IV—IV in Fig. III, and showing how the shelves are removably supported at the side walls of the cabinet.

Fig. V is a fragmentary detail sectional view taken as indicated by the arrows V—V in Fig. I, and showing how the shelves are removably supported at vertical partitions by which the cabinet is divided into columnar sections.

Fig. VI is a plan view of one of the shelves with a type chute in place thereon.

Fig. VII is a sectional view along one side edge of the shelf, taken as indicated by the arrows VII—VII in Fig. VI.

Fig. VIII is a fragmentary perspective view of one of the lower corners of the shelf.

Fig. IX shows one of the type chutes as it appears when viewed from above.

Fig. X is a fragmentary detail view on a larger scale taken as indicated by the arrows X—X in Fig. VI.

Fig. XI is a perspective view of the delivery end of one of the type chutes.

Fig. XII is a cross sectional view of the type chute, taken as indicated by the arrows XII—XII in Fig. XI.

Fig. XIII shows one of the trunnions for pivotal attachment of the type keeper means associated with the chute.

Fig. XIV is a fragmentary perspective illustration showing the delivery end of the type chute as it appears viewed from the back.

Fig. XV is a detail view showing the manipulating handle for the keeper means.

Fig. XVI is a fragmentary view, partly in elevation and partly in section, showing how the manipulating handle is secured to the keeper means.

Fig. XVII is a fragmentary perspective view of a transfer channel which I have devised to expedite loading of the chutes with the type.

Fig. XVIII is a view showing the manner in which the transfer channel is coupled with a type chute.

Fig. XIX is a view similar to Fig. XVIII showing the type shifted from the loading channel into the chute.

Fig. XX is a view similar to Fig. XVIII showing how the type blocks are individually removed from the chute.

Fig. XXI is a fragmentary elevation of the delivery end of the type chutes, viewed as indicated by the arrows XXI—XXI in Fig. XX.

Fig. XXII is a view corresponding to Fig. XX showing a slightly modified keeper means for type blocks of small point sizes.

Fig. XXIII is a fragmentary detail sectional view taken as indicated by the arrows XXIII—XXIII in Fig. XXII.

Fig. XXIV is a view corresponding to Fig. XXIII showing how the modified keeper means is assembled with the chute.

Fig. XXV is a fragmentary detail view taken as indicated by the arrows XXV—XXV in Fig. XXIV.

Figs. XXVI and XXVII are views corresponding to Fig. XII showing modified details of keeper construction.

Fig. XXVIII is a view corresponding to Fig. XI showing still another modified form of keeper.

Fig. XXIX is a view corresponding to Fig. XIV showing a modified form of type chute.

Figs. XXX, XXXI, XXXII, XXXIII and XXXIV are views corresponding respectively to Figs. III, IV, VI, X and VIII showing an alternative embodiment of my invention.

As delineated in Figs. I, II and III of these illustrations, my improved type storing and dispensing cabinet comprises a frontally open housing 1 which is constructed throughout from sheet metal with straight solid side walls 2, a solid back 3, an angle section perimetric bottom frame 4, and a downwardly-sloping top 5. From Fig. IV it will be observed that the side walls 2 are stiffened by box formations 6 along their frontal edges; and from Figs. I and V, it will be observed that the interior of the housing is subdivided into three columnar compartments by a pair of centrally-open, hollow, vertical partitions 7 which are equally spaced relative to each other and to said side walls. The separately formed front and rear sections 7a and 7b of the partitions 7 are of deep channel cross section, and the rear section 7a of each partition has lateral flanges 7c engaged behind offset margins of retaining strips 7d which are welded or otherwise permanently secured to the back wall 3 of the cabinet. Horizontally-aligned diaphragms 8 set apart spaces in the lower portion of the housing for a number of utility drawers 9, (see Fig. I) which are slidable in confining channel guides 10. As shown in Fig. II, these drawer guides 10 are secured to hollow vertical battens 11 permanently attached in spaced relation to the end walls 2 and to the vertical dividing partitions 7. If desired, the drawers may be omitted from the structure, and the bottom frontal portion of the cabinet finished off plain.

Disposed in each columnar subdivision of the housing 1 above the horizontal diaphragm 8 is a multiplicity of downwardly sloping shelves 12 which are exact duplicates of each other, and each of which carries a number of gravity-feed type chutes 13 in close laterally-spaced relation, with their delivery ends individually accessible at the front of the cabinet. The shelves 12 are supported, with capacity for individual removal from the housing, by vertically-spaced inclined channel strips 14 some of which are secured to the battens 11 on the side walls 2 of the housing and others of which are secured to the vertical subdividing partitions 7.

As shown in Figs. VI, VII, VIII and X, each shelf 12 is fashioned to rectangular configuration from a flat sheet metal blank, and has its front and rear edges stiffened by retroversions 15. Narrow marginal portions along the side edges of each shell 12 are offset upwardly as at 16, and welded or otherwise secured in the hollows of the offsets are filler strips 17. This construction results in double thickness reinforced edgings which terminate short of the frontal corners of the shelf 12, said corners being cut away angularly as at 18 with formation of single thickness stop shoulders at 19.

Referring to Fig. III, the lower flanges of the shelf-supporting channels 14 are turned upwardly as at 20 to receive the corner shoulders 19 of the shelves 12, thereby to hold said shelves in place within the housing 1. By pushing a shelf 12 upward on its supporting strips 14 until the shoulders 19 clear the hooks 20 and then lifting the lower edge of the shelf clear of said hooks, such shelf can obviously be withdrawn downwardly and removed from the housing 1 together with the attached type chutes 13. To facilitate insertion of the shelves into the entrant ends of the supporting channel strips 14, the upper flanges of the latter are cut away at the front end as at 21, so that the upper edges of the shelves may be initially rested on the hooks 20 preparatory to sliding the shelves into place. This operation is further facilitated by upward projections 22 of the channel strips 14 which constitute guides for the side edges of the shelves at the entrant ends of said strip channels. At the inner ends of the supporting strips 14, the upper flanges of the latter more closely approach the lower flanges through easy curves at 23, with incidental narrowing of the channels, as at 24, to a width corresponding substantially to that of the reinforced side edges 16 of the shelves. Thus, with the lower corners 19 of the shelves 12 engaged in the hooks 20 of the supporting strips 14 and the thickened side edges 16 engaged in the narrowed upper channel portions 24 of said supporting strips, the shelves are effectively held against any tendency to vibrate or rattle. The rounding 23 of the top flanges of the supporting strips 14 obviously eases the entry of the top edges of the shelves 12 into the narrowed channel portions 24 as the shelves are slid into place.

Referring now to Figs. VI, IX, X and XVIII to XXI, the type chutes 13 are fashioned to channel section preferably from cadmium-coated non-corrosive sheet metal such as hard aluminum or stainless steel, and said chutes are suitably dimensioned to accommodate single file rows or stacks of type blocks T, with said blocks projecting above the side flanges of the chutes. At their delivery ends, the chutes 13 are formed in their bottoms with punched-out, downwardly-offset spring tongues 25 which are adapted to engage over the bottom edges of transversely-aligned receiving apertures 26 in the shelf 12 adjacent the lower edge of the latter. Near the upper ends of the chutes 13, the chute bottoms are formed with punched-out downwardly-displaced eyes 27 which are adapted to engage suitably-allocated, transversely-aligned receiving apertures 28 in the shelf adjacent its top edge. A retaining pin or rod 29 passed continuously through the eyes 27 of the type chutes 13 at the back of the shelf 12, serves to lock said chutes securely in position. Accordingly, upon removing a shelf 12 from the housing 1 and withdrawing the retaining pin 29, any one of the chutes 13 may be removed, simply by lifting its upper end to disengage the eye 27, and then shifting the chute upward to disengage its spring hook tongue 25 from the corresponding aperture 26 in the lower portion of the shelf. This obviously permits interchange of the chutes for different kinds or sizes of type as well as replacement of the chutes when desired or required. The upper end of each type chute 13 is closed as at 30; while the bottom or delivery end of the chute is notched centrally as at 31, and formed with an upturned stop lip 32 of sufficient height to arrest the lowermost type block T of the row or stack and yet permit ready removal of such type block in a manner presently explained. At one corner of the delivery end of each type chute 13, the chute bottom is rounded upwardly as at 33 in Figs. XIV and XIX, whereby the lowermost type block T is angularly displaced upward in respect to the others in the row or stack as shown in Figs. XI, XIX and XXI so that it may be easily grasped, also as later explained.

Associated with each type chute 13 at the delivery end thereof (Figs. XI, XII, XVIII–XXI) is a keeper means 35 comprising a yoke member 36 which bridges the chute, and which has its extremities 37 pivoted to trunnions 38 on the side flanges of the chute. Initially, each of these trunnions 38 has the form shown in Fig. XIII with a relatively short axial portion 39 to one side of a circumferential shoulder flange 40; a bearing portion 41 at the other side of said flange; and an axial projection or tip 42 of smaller diameter, with a counterbored end, beyond the bearing portion. The trunnions 38 I secure to the chute 13 at the proper locations by a welding operation incident to which the anchorage projections 39 of said trunnions are fused into the outer faces of the chute as shown in Fig. XXIII. In assembling, flat annular friction washers 44 are placed over the trunnions 38, whereupon the yoke member 36 of the keeper 35 is applied by springing its extremities 37 to clear said trunnions 38, and then allowing them to snap into place with their pivot apertures 43 engaging the bearing portions 41 of the trunnions and pressing against the flange portions 40 of the latter as shown in Fig. XII. Finally, dished friction washers 45 are placed over the tip ends 42 of the trunnions 38 whereupon said tip ends are upset or peened as in Fig. XXI to hold the parts permanently assembled. By virtue of this construction, the keeper yoke member 36 will be frictionally held with positiveness in any position to which it is adjusted.

Referring again to Figs. XI and XVIII–XX, the top surface 46 of each yoke member 36 is formed with opposed pairs of upwardly-offset, punched-out tongues 47 in laterally-spaced relation. In slidably-adjustable engagement with the tongues 47 is a plate 48 whereof the lower portion is bifurcated with provision of a pair of flexible spring fingers 49 and 50 beyond the flat supporting surface 46 of the yoke member 36, one of said fingers being provided with a broadened circular portion 50a bearing the character corresponding to that of the type with which the chute is loaded. The upper portion of each plate 48 is centrally depressed, as at 51, to frictionally bear under pressure against the top surface 46 of the yoke member 36, as shown in Fig. XII for maintenance of said plate in longitudinally-adjusted positions. The long spring finger 49 of the plate 48 is adapted to lap the top of the lowermost type block T in the chute 13 by a very slight margin as clearly illustrated in Figs. XI and XIX; while the short finger 50 is adapted to engage the next adjacent type block immediately adjacent the forward edge of the latter. As an alternative, the spring fingers 49 and 50 may be formed as extensions of separate superposed plates engaged beneath the tongues 47 and capable of independent longitudinal adjustment on the yoke member 36. In practice, the yoke member 36 is positionally adjusted on its friction pivots, and the plate 48 longitudinally adjusted on said yoke member so that the tips or ends of the spring fingers 49 and 50 bear with light pressure on the tops of the type blocks T, such adjustment being facilitated by means of an outwardly and upwardly-bent manipulating handle 52 attached to said yoke member at one side. The adjustment just referred to must of course be made to adapt the chute for type blocks of different point sizes and set widths with the spring fingers 49 and 50 positioned as shown in Fig. XI with respect to the lowermost and adjacent type blocks T. To remove the lowermost type block T, the same is grasped between the thumb and the forefinger of one hand after the manner illustrated in Fig. XX, with the thumb bearing on the top of such block in the interval between the fingers 49 and 50, and the forefinger engaging the bottom of the block through the central notch 31 in the bottom of the chute 13. The lowermost type block T is thereupon rocked forwardly about its frontal lower corner which is arrested by the lip 32 on the chute 13 as indicated in dotted lines in Fig. XX, the spring finger 49 yielding to permit this action in a manner which will be obvious from the illustration, when said type block will ultimately drop of itself from the mouth of the chute into the palm of the compositor's hand. Incident to this operation, the short spring finger 50 will hold the succeeding type block and prevent its removal at the same time. After withdrawal of a type block T as just explained, the rest of the blocks in the chute 13 will shift downward by gravity, the new lowermost one being incidentally pushed beyond the short spring tongue 50 of the keeper means until it is arrested by the lip 32 and yieldingly retained by the longer tongue 49.

For the purposes of manufacturing economy, the manipulating handle 52 for the keeper device 35 is fashioned from stout wire to the configuration shown in Fig. XV, with a flattened anchorage portion 52a having spaced spot projections 52b, and said handle permanently secured by welding, incident to which the spot projections are melted and fused into the metal of the yoke member 36, as conventionally indicated at 52c in Fig. XVI. As a result of this procedure the inner side of the yoke member 36 is left perfectly flush with avoidance of any surface projections which might interfere with the free movement of the type blocks along the chute. Through provision of the manipulating handle 52, it is possible to swing the yoke member 36 about its pivots 38 when the corresponding pipe channel 13 is to be refilled, without disturbing the spring finger plate 48 previously adjusted for type of a definite point size, which latter contingency might readily occur if the spring ends 49 and 50 of said plate were grasped in lifting and depressing said yoke member. It is thus possible to maintain a continuously accurate setting of the spring finger plate 48 for a particular type block, with consequent saving, to the compositor, of valuable time which would otherwise be wasted in making repeated adjustments. The keeper means 35, here featured, are in practice proportioned to pass type up to seventy-two point size. By adjustment, the keeper means 36 may however be set for action upon all intermediate sizes of type down to eighteen point characters. The spring fingers 49 and 50 may be straight as shown, or their ends may be bent slightly to either increase or decrease the angle of contact with the type blocks in order to render the removal of the type blocks easier and to ensure more positive and accurate delivery, especially with regard to smaller point sizes and narrower set widths. To illustrate: the angle at which the spring fingers 49 and 50 contact with seventy-two point type is less acute than for eighteen point type. Thus, by bending the ends of the spring fingers 49 and 50 slightly downward to increase the angle, the corresponding chute 13 may be adapted for seventy-two point type blocks, or, by bending the ends of said spring fingers slightly upward and thereby lessening the angle, the chute may be adapted for eighteen point type.

Fig. XXIX shows an alternative form of type chute 13d wherein the chute bottom is flat throughout, and wherein the end portions of the chute bottom to opposite sides of the central notch 31d are both of the same construction, i. e., both provided with angularly bent stop lips 32d. In use of the modified chute 13a, the endmost type block is slightly in the chute raised by upward pressure of the forefinger of the hand through the notch 31d so that the thumb may catch the upper rear edge of such block to roll the same over the stop lips 32d incident to removing it.

Fig. XXVI shows a modified form of yoke member 36e which is provided along its upper corner edges with recesses 47e adapted to be engaged by the spring finger plate 48e, which, in this instance, is formed with an upwardly offset portion 51e to frictionally engage the flat top of said yoke member. This construction of yoke member 36 may also be used for superposed plates with which the spring fingers are individually formed as hereinbefore explained.

In the form of yoke member featured at 36g in Fig. XXVII, the sides or extremities 37g are folded under and doubled with incidental formation of shoulders 47g and provision of a channel for retaining the spring finger plate 48g.

In the alternative form shown in Fig. XXVIII, the extremities 37h of the keeper yoke 36h are frictionally fulcrumed on rivets 38h whereof the shanks extend through apertures in the side walls of the type chute 13h, the latter being offset outwardly as at 61 with formation of recesses for the rounded heads 62 of said rivets so that there may be no interference with the movement of the type. The edges of the plate affording the spring fingers 49h and 50h are here engaged in grooves along the sides of the yoke member 36h in the same manner as described in connection with Fig. XXVI.

For type blocks of relatively smaller sizes, I may resort to the keeper construction shown at 35f in Figs. XXII–XXV. Here, the yoke member 36f of the keeper 35f is devoid of side extremities which will not permit of its being sprung into place over the ends of the trunnions 38 on the chute 13f as readily as was the case with the first described form of yoke member. Accordingly, I form the pivot portions 37f of the yoke member 36f with radial entrant notches 53 of a width corresponding to the diameter of the projecting tips 42 of the trunnions 38, said notches leading to the pivot openings 43f which have a diameter corresponding to that of the bearing portions 41 of said trunnions. Thus, in applying the modified yoke member 36f, the notches 53 in its pivot portions 37f are engaged over the tips 42 of the trunnions 38 whereupon said yoke member is shifted until registry is effected between the pivot apertures 43f and the bearing portions 41 of said trunnions. After application of spring washers 45, the trunnion tips 42 are headed over or peened as before explained in connection with Fig. XXIV. In all other respects the construction of the modified form of keeper means of Figs. XXII–XXV is exactly like that of the first described type, and its corresponding parts have accordingly been identified with the same reference numbers except for the addition, in each instance, of the subscript "f" for the purposes of distinction.

In order to make it possible to fill the chutes 13 and 13f individually without necessitating the removal of them from the housing 1, I provide loading channels 55 such as shown in Figs. XVII–XIX, adapted to receive the type directly from the type casting machine. These channels 55 are made of a length to accommodate a definite number of type blocks T, and are fashioned to cross-sectionally conform with the type chutes 13. At its delivery end each loading channel 55 has its side flanges cut away as at 56, and the projecting portion of its bottom 57 rounded upwardly as at 58 and terminating in a downturned lip 59. Each loading channel 55 is moreover provided at its discharge end with a centrally-located pendant stud 60. In using the loading channel 55, its projecting rounded end 57 is inserted, as shown in Fig. XVIII, into the hollow of the chute 13 which is to be filled and its stud 60 engaged in the central notch 31 at the delivery end of said chute. With the loading channel 55 so positioned and the keeper device 35 of the chute 13 raised, the type is shifted en masse upward into said chute until the last type block T has passed the lip 59. The loading channel 55 is next backed away with the type in the chute 13 following, until its lip 59 is arrested by the lip 32 of said chute. Thereupon, the loading channel 55 is lifted to disengage its lip 59 and withdrawn, with attendant shifting of the type further downward in the chute 13 until the endmost type block T is caught by the lip 32. Finally, the keeper device 35 is swung back to operative position with the spring fingers 49 and 50 bearing on the two leading type blocks in the manner already understood.

The cabinet may be designed as shown in Fig. II, to accommodate in its upper part, shelves 12 with chutes 13 for small type having keeper means of the form 35f; and at its lower part, shelves 13 with chutes for the large type fitted with keeper means of the form 35. Cabinets may also be designed for evenly spaced shelves with chutes all having keeper means of the form 35f or with shelves all having keeper means of the form 35. In the latter of these two instances, the shelves will of necessity be spaced further apart than in the first case, and therefore less of them will be accommodated in a cabinet of the same size, but when considered from the utilitarian advantages gained, this deficiency is of small consequence as will presently appear. Cabinets of the last mentioned varieties are in some instances more desirable than cabinets of the illustrated variety in that the keeper devices of the various chutes may be pre-set for types of different sizes, and the shelves universally rearranged so that different sizes or kinds of type may be placed by the compositor to suit his convenience.

In the alternative embodiment of my invention shown in Figs. XXX–XXXIV, the shelf supporting members 14x are open at the top, i. e., they are of right angle cross section with side and bottom flanges. At their outer ends, the bottom flanges of the shelf supports 14x are formed with upwardly and rearwardly bent hooks 20x like the hooks 20 of the first described embodiment, and at their inner ends with upwardly and forwardly turned hooks 64 of a length substantially twice that of the hooks 20x. The shelves 12x of the modified embodiment are made perfectly flat, i. e., without side edge reinforcements and without bottom corner notches of the first described embodiment, but being provided with transversely arranged apertures 26x and 28x adjacent their upper and lower edges, the notches being in this case all of rectangular configuration. The shelves 12x are inserted into the cabinet by sliding their top edges upwardly along the bottom flanges of the supports 14x until they are fully engaged beneath the hooks 64, whereupon they are shifted downward on the supports to engage their edges in the hooks 20x at the forward ends of said supports. The type chutes 13x of the alternative embodiment are provided adjacent their upper ends with punched out hooks 25x, adapted to engage the lower edges of the apertures 28x of the shelf, and adjacent their lower ends with punched out eyes 27x which are adapted to be projected through the apertures 26x in the shelves with their tops bearing against the top edges of said apertures 26x, and to be engaged by keeper pins 29x. The chutes 13x are accordingly secured against rattling, and held against accidentally sliding out of place when the keeper pin 29x is withdrawn as presently explained. By virtue of this construction, it is possible to remove the chutes 13x without completely withdrawing the shelves from the cabinet. Thus, to remove the chutes 13x from any particular shelf, such shelf is first shifted upward on the bottom flanges of its supports 14x until its lower edge clears the hooks 20x of said supports. The outer end of the shelf is thereupon lifted and the shelf permitted to slide downward until eyes 27x of the chutes 13x are beyond the confines of the cabinet as instanced in one case in Fig. XXX, whereupon the keeper pin 29x may be removed and any desired chute or all the chutes removed and replaced by others. The removal of the chute or chutes is accomplished by first lifting its bottom end to disengage the eye 27x from the corresponding aperture 26x in the shelf, and then shifting the chute upward to disengage the hook 25x from the lower edge of the corresponding notch 28x. The alternative construction just described is also advantageous in that the lowermost shelf may be positioned closer to the bottom of the cabinet than is feasible with the first described construction due to the absence of upper flanges on the supports 14x which permits the shelf to be lifted incident to withdrawal from the cabinet.

From the foregoing it will be seen that I have provided a novel type cabinet wherein the chute supporting shelves may be adjusted and rearranged at the pleasure of the compositor to suit various requirements of practice, and wherein the dispensing means will control removal of type blocks successively from the chutes. The compositor is thus able to select the type which is called for with the greatest ease and rapidity in composing. By casting the type directly into the loading channels and transferring them directly to the chutes of the cabinet, the need for storage boxes and the necessity for sorting the type, as heretofore, is entirely dispensed with, and the possibility of typographical errors is greatly minimized since the compositor has no "pied" type to contend with.

Having thus described my invention, I claim:

1. A printer's type cabinet comprising a frontally-open housing fabricated from sheet metal with straight side walls, a solid back and a sloping top, and vertically-spaced inclined shelves sustained, with capacity for individual removal, within the housing, each of said shelves supporting a number of gravity-feed type chutes side by side in close contiguity with their delivery ends accessible at the front of the housing.

2. A printer's type cabinet comprising a frontally-open housing fabricated from sheet metal with straight side walls, a solid back and a sloping top, laterally-spaced vertical partitions apportioning the interior of the housing into a number of columnar subdivisions, and vertically spaced inclined shelves sustained, with capacity for individual removal, within the columnar subdivisions, each of said shelves supporting a number of gravity-feed type chutes side by side in close contiguity with their delivery ends accessible at the front of the housing.

3. A printer's type cabinet comprising a frontally-open housing fabricated from sheet metal with straight side walls, a solid back and a sloping top, laterally-spaced vertically partitions apportioning the interior of the housing into a number of columnar subdivisions, horizontal diaphragms setting apart spaces in the lower portion of the housing for accommodation of a number of utility drawers, vertically spaced inclined shelves sustained, with capacity for individual removal, within the columnar subdivisions above the horizontal diaphragms, each of said shelves supporting a number of gravity-feed type chutes side by side in close contiguity with their delivery ends accessible at the front of the housing.

4. A printer's type cabinet comprising a frontally-open housing fabricated from sheet metal with straight side walls stiffened by hollow box formations along their front edges, a solid back and a sloping top, spaced hollow vertical battens on the side walls within the housing, vertically-spaced inclined channel strips secured to said battens, and shelves removably engaged in the channels of said strips, each of said shelves supporting a number of gravity-feed type chutes side by side in close contiguity with their delivery ends accessible at the front of the housing.

5. A cabinet of the character described constructed from sheet metal having side walls, a back wall, a top, a bottom, and spaced vertical partitions with lateral flanges engaging behind marginally-offset portions of retaining strips secured to the back wall aforesaid.

6. In combination, a gravity-feed type chute affording a type block guiding channel with a stop lip transversely of its lower end, the bottom of the chute adjacent the lip being rounded at one corner for effecting upward angular displacement of the lowermost type block in the series relative to the others to facilitate grasping it; and yielding keeper means at the delivery end of the chute permitting removal of the lowermost type block while holding the next contiguous type block in the chute against the possibility of being removed at the same time.

7. In combination, a gravity feed type chute of channel section with a transverse stop lip at its delivery end; and a cooperative keeper means including a spring finger with its end lapping the top of the lowermost type block in the chute and capable of yielding to rolling of said type block over the stop lip incident to removing it, and a shorter retaining finger to engage the top of the next adjacent type block in the chute, the latter finger permitting gravitation of the type for presentation of a new type block in place of the one removed.

8. A combination in accordance with claim 7, including means enabling adjustment of the spring fingers to vary the pressure on the type blocks.

9. A combination in accordance with claim 7, including means whereby the spring fingers may be adjusted to variantly space their ends relative to the stop lip in adapting the chute for type blocks of different sizes.

10. A combination in accordance with claim 7, wherein the spring fingers are supported by a member frictionally pivoted to the chute for the purposes of adjusting the pressure of said fingers upon the type blocks.

11. A combination in accordance with claim 7, wherein the spring fingers are mounted on a supporting member frictionally pivoted to the chute for adjustment of the pressure upon the type blocks, and wherein the spring fingers are adjustable on the holder for variant spacing of their ends relative to the stop lip in adapting the chute for type blocks of different point sizes.

12. A combination in accordance with claim 7, wherein the spring fingers are mounted on a supporting member frictionally pivoted to the type chute so that it may be adjusted to vary the pressure of said fingers upon the type blocks, and wherein the fingers are in frictional sliding engagement with the supporting member for the purposes of adjustment to vary the spacing of their ends relative to the stop lip in adapting the chute for type blocks of different point sizes.

13. A combination in accordance with claim 7, wherein the spring fingers are mounted on a supporting member frictionally pivoted to the chute for adjustment of the pressure upon the type blocks, wherein the spring fingers are adjustable on the holder for variant spacing of their ends relative to the stop lip in adapting the chute for type blocks of different point sizes, and wherein the supporting member is provided with a manipulating handle whereby it may be adjusted on its friction pivots without danger of disturbing the adjustment of the spring fingers.

14. A combination in accordance with claim 7, wherein the spring fingers are mounted on a supporting member frictionally pivoted to the chute for adjustment of the pressure upon the type blocks, wherein the spring fingers are adjustable on the holder for variant spacing of their ends relative to the stop lip in adapting the chute for type blocks of different point sizes, and wherein the supporting member is provided with a manipulating handle whereby it may be adjusted on its friction pivots without danger of disturbing the adjustment of the spring fingers, said handle being fashioned from wire with spaced spot projections adapted to be fused incident to permanent attachment of the handle to the supporting member by welding.

15. In combination, a gravity feed type chute fashioned to channel section from sheet metal for guiding a series of type blocks and having a stop lip at its delivery end; and a cooperative keeper means including a long spring finger with its end lapping the top of the lowermost type block in the chute and capable of yielding to rolling of said type block over the stop lip incident to removing it, a shorter spring retaining finger to engage the top of the next succeeding type block in the chute, the latter finger permitting gravitation of the type for presentation of a new type block in place of the one removed, a yoke member supporting the spring fingers and having its extremities frictionally pivoted on the sides of the chute to enable adjustment of the spring fingers toward and away from the type, each pivotal connection comprising a trunnion stud welded to the chute side, and friction washers engaging the opposite faces of the corresponding yoke extremity and held in assembly by a peened head on said stud.

16. A printer's type cabinet comprising a housing; vertically-spaced inclined shelves supporting a number of gravity feed type chutes side by side with their discharge ends accessible at the front of said housing, each of the chutes having a longitudinally-directed spring hook tongue on its bottom to engage the edge of an opening in the corresponding shelf, and an eye in spaced relation to the tongue adapted to engage another opening in the shelf; and a removable retaining pin adapted to engage continuously through the eyes of the several chutes beneath the shelf.

17. A printer's type cabinet in accordance with claim 16, wherein the hook tongue is directed downwardly of each chute and located near the lower end of the latter, and wherein the eye is near the upper end of the chute.

18. A printer's type cabinet in accordance with claim 16, wherein the type chutes are fashioned to channel section from sheet metal with the spring tongues, and the eyes are offset from the chute bottoms.

19. A printer's type cabinet comprising a frontally-open housing; a series of vertically-spaced shelves sloping downwardly toward the front of the housing and removable endwise from the same; and a number of separately-detachable gravity-feed type chutes supported side by side on each of said shelves, with their discharge ends accessible at the front of the housing.

20. A cabinet of the character described comprising a frontally-open housing, a vertically-spaced series of shelf sustaining channel strips secured to the side walls of the housing and sloping downwardly toward the front of the latter; and removable shelves engaging the channel hollows of the strips and having their lower edges engaged in hooks formed in prolongations of the bottom flanges of said strips.

21. A cabinet of the character described comprising a frontally-open housing, a vertically-spaced series of shelf sustaining channel strips secured to the side walls of the housing and sloping downwardly toward the front of the latter; said strips having their channels narrowed at their rear ends, and having rearwardly projecting hook retroversions formed from prolongations of their bottom flanges at their forward ends; and shelves supported and interchanged on corresponding pairs of the sustaining strips with capacity for removal by shifting the shelves upward in the narrowed portions of the strip channels until the forward edges of the shelves clear the hook retroversions aforesaid, lifting the frontal edges of the shelves above the hook retroversions, and withdrawing the shelves endwise from the cabinet.

22. A cabinet of the character described comprising a frontally-open housing; a vertically-spaced series of shelf sustaining angle strips secured to the side walls of the housing and sloping downwardly toward the front of the latter, said strips having at the forward end of their lateral flanges rearwardly-projecting hook retroversions, and at the rear ends of said flanges, forwardly-projecting hook retroversions of substantially twice the length of the first mentioned retroversions; and shelves supported on corresponding pairs of said sustaining strips with capacity for removal and interchange, by shifting them upward into the long-hook retroversions of the sustaining strips to clear their frontal edges from the shorter hook retroversions of said strips, lifting the frontal edges of the shelves above the latter retroversions and withdrawing the shelves endwise from the cabinet.

23. A printer's type cabinet comprising a housing; a series of shelves removably-supported at a downward inclination within the housing and each supporting a multiplicity of gravity-feed type chutes side by side with their discharge ends accessible, at the front of the housing, said chutes respectively having downwardly directed hooks near their upper ends to engage openings near the top of the corresponding shelves, and eyes to project through openings near the bottom edges of the shelves for engagement by transverse locking pins at the backs of the shelves, whereby, upon partial withdrawal of the shelves endwise from the cabinet, the locking pins may be withdrawn and the type chutes individually detached and interchanged.

24. In combination, a printer's type cabinet housing a multiplicity of inclined gravity-feed channel type chutes; said chutes having central notches in their bottoms, and upturned terminal lips at their delivery ends constituting stops for the type; and type loading channels adapted to receive the type directly from a type casting machine, said loading channels having their bottoms upwardly-rounded at the discharge ends and terminating in downwardly-turned terminal lips to hook over the stop lips of the type chutes, and pendant centering studs to engage the central notches of the type chutes, for releasable coupling of the loading channels with the type chutes so that the type may be slid en-masse from said channels into said chutes.

25. In combination, a printer's type cabinet housing a multiplicity of inclined gravity-feed channel type chutes with spring fingers at their delivery ends to control individual release of the type blocks, said fingers being attached with capacity to be moved out of the way to permit replenishing of the chutes with type from time to time; and type loading channels adapted to receive the type directly from a type casting machine, said loading channels having provisions at their discharge ends whereby they may be coupled with the delivery ends of the respective chutes so that the type may, after retraction of the spring fingers aforesaid, be slid en-masse into said chutes.

26. In combination, a gravity-feed type chute of sheet metal; a yoke member also of sheet metal fulcrumed on studs flush-welded to opposite sides of the chute with capacity for adjustment of the yoke member toward and away from said chute; compression friction washers on the studs aforesaid engaging the pivot extremities of the yoke at opposite sides to hold said yoke in adjusted positions; and spring fingers for yieldingly engaging the type in the chute supported with capacity for longitudinal adjustment in the yoke.

27. In combination, a gravity-feed type chute, an arching yoke member with pendant extremities frictionally pivoted to the sides of the chute to enable adjustment of said yoke member toward and away from the chute; and spring tongue members for yieldingly retaining the type in the chute, frictionally engaged with capacity for lengthwise adjustment in the top of the yoke member.

28. In combination, a gravity-feed type chute, a bridging yoke member fashioned from sheet metal with pendant extremities frictionally pivoted to the sides of the chute to enable adjustment of the yoke member toward and away from the chute, said yoke member being joggled with formation of internal longitudinal channel grooves in its sides immediately below the top thereof; and spring fingers also of sheet metal adapted to yieldingly retain the type in the chute, being frictionally engaged for endwise adjustment in the yoke with their edges engaging the channels aforesaid.

29. In combination, a gravity-feed type chute, a yoke member fashioned from sheet metal with double thickness pendant extremities frictionally fulcrumed to the sides of the chute to enable adjustment of the yoke member toward and away from the chute; and spring tongue members also of sheet metal for yieldingly retaining the type in the chute frictionally engaged, with capacity for lengthwise adjustment in the yoke member, with their edges held in channels formed between the top of said yoke member and the top edges of the inner thicknesses of the yoke sides.

30. In combination, a gravity chute; an arching yoke member with pendant extremities frictionally pivoted to the sides of the chute; rivets forming the pivot axes for the yoke member and having their heads lodged in outward recesses of the chute sides to preclude interference with sliding of the type along the chute; and spring tongue members for yieldingly retaining the type in the chute, frictionally engaged with capacity for lengthwise adjustment in the yoke member.

31. In combination, a gravity chute with a channel accommodating a row of type blocks and with an upstanding lip at its discharge end operative as a stop for the lowermost type block of the series; and a keeper in the form of a yielding tongue overlying the type blocks with its end slightly lapping the top rear corner of the lowermost type block so as to retain the latter with capacity for being removed by rolling it forwardly over the stop lip.

32. A gravity chute according to claim 31, with means for displacing the lowermost type block laterally beyond its neighbor to facilitate its removal.

33. In combination, a gravity chute with a channel accommodating a row of type blocks and with an upstanding lip at its discharge end operative as a stop for the lowermost block of the series; and a keeper in the form of a yielding clevised tongue with its extremities bearing upon the top of the block next to the lowermost one and with the end of one of said extremities slightly lapping the top rear corner of said lowermost block so as to retain the latter with capacity for being removed by rolling it forwardly over the stop lip.

34. A gravity chute according to claim 33, with means for angularly displacing the lowermost type block upwardly beyond its neighbor to facilitate its removal.

ALFRED B. BELL.